(12) United States Patent
Damnjanovic et al.

(10) Patent No.: US 9,408,232 B2
(45) Date of Patent: Aug. 2, 2016

(54) METHOD AND APPARATUS FOR CONTENTION-BASED WIRELESS TRANSMISSIONS

(75) Inventors: Aleksandar Damnjanovic, Del Mar, CA (US); Sai Yiu Duncan Ho, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 572 days.

(21) Appl. No.: 13/090,942

(22) Filed: Apr. 20, 2011

(65) Prior Publication Data

US 2011/0263286 A1    Oct. 27, 2011

Related U.S. Application Data

(60) Provisional application No. 61/326,569, filed on Apr. 21, 2010.

(51) Int. Cl.
*H04W 72/00* (2009.01)
*H04W 74/00* (2009.01)
(Continued)

(52) U.S. Cl.
CPC ............ *H04W 74/008* (2013.01); *H04W 28/06* (2013.01); *H04W 28/18* (2013.01); *H04W 48/08* (2013.01); *H04W 72/042* (2013.01);
(Continued)

(58) Field of Classification Search
CPC ... H04W 72/04; H04W 16/02; H04W 52/146; H04W 52/04

USPC ............. 450/450, 69, 451, 452.1, 452.2, 453
See application file for complete search history.

(56) References Cited

U.S. PATENT DOCUMENTS

2009/0232095 A1* 9/2009 Ahn et al. ..................... 370/331
2009/0286566 A1* 11/2009 Lindholm et al. ............ 455/522
(Continued)

FOREIGN PATENT DOCUMENTS

CN        101379784 A      3/2009
JP        2009049465 A     3/2009
(Continued)

OTHER PUBLICATIONS

Ericsson et al., "Impacts of contention based uplink in RAN2", 3GPP Draft; R2-100125 Impacts of Contention Based Uplink in RAN2, 3rd Generation Partnership Project (3GPP), Mobile Competence Centre ; 650, Route Des Lucioles ; F-06921 Sophia-Antipolis Cedex ; France, vol. RAN WG2, no. Valencia, Spain; 20100118, Jan. 12, 2010, XP050420941, [retrieved on Jan. 12, 2010].
(Continued)

*Primary Examiner* — Tu X Nguyen
(74) *Attorney, Agent, or Firm* — Dalei Dong

(57) ABSTRACT

Certain aspects of the present disclosure relate to a technique for managing contention-based uplink data transmissions. According to certain aspects, a base station may allocate a common contention-based resource to a plurality of user equipment (UEs). The plurality of UEs may utilize the contention-based resource to transmit uplink data without prior scheduling, which may result in transmission collisions. Certain aspects of the present disclosure provide a mechanism for determining which UE sent an uplink transmissions based on one or more transmission parameter signaled to the UEs.

36 Claims, 4 Drawing Sheets

(51) Int. Cl.
*H04W 28/06* (2009.01)
*H04W 28/18* (2009.01)
*H04W 48/08* (2009.01)
*H04W 72/04* (2009.01)
*H04W 72/08* (2009.01)
*H04W 74/08* (2009.01)

(52) U.S. Cl.
CPC ......... *H04W72/087* (2013.01); *H04W 74/0833* (2013.01); *H04W 74/0866* (2013.01)

(56) References Cited

U.S. PATENT DOCUMENTS

| | | | |
|---|---|---|---|
| 2010/0054145 A1* | 3/2010 | Frenger et al. | 370/252 |
| 2010/0135240 A1* | 6/2010 | Kim et al. | 370/329 |
| 2010/0195615 A1* | 8/2010 | Lee et al. | 370/330 |

FOREIGN PATENT DOCUMENTS

| | | | |
|---|---|---|---|
| JP | 2009105746 A | | 5/2009 |
| JP | 2009521893 A | | 6/2009 |
| JP | 2010510712 A | | 4/2010 |
| WO | WO-2007052753 A1 | | 5/2007 |
| WO | WO-2007078173 A1 | | 7/2007 |
| WO | WO-2008060201 A1 | | 5/2008 |
| WO | WO-2010021489 A2 | | 2/2010 |

OTHER PUBLICATIONS

Ericsson et al., "Stage 2 description of the contention based uplink", 3GPP Draft; 36300_CRXXXX_(REL-10)_R2-100126 Stage 2 Description of the Contention Based Uplink, 3rd Generation Partnership Project (3GPP), Mobile Competence Centre ; 650, Route Des Lucioles ; F-06921 Sophia-Antipolis Cedex ; France, vol. RAN WG2, no. Valencia, Spain; 20100118, Jan. 12, 2010, XP050420873, [retrieved on Jan. 12, 2010].

Ericsson: "LTE Advanced Latency Performance", 3GPP Draft; R2-092080, 3rd Generation Partnership Project (3GPP), Mobile Competence Centre; 650, Route Des Lucioles; F-06921 Sophia-Antipolis Cedex; France, no. Seoul, Korea; 20090317, Mar. 17, 2009, XP050339941, [retrieved on Mar. 17, 2009].

International Search Report and Written Opinion—PCT/US2011/033435, ISA/EPO—Jul. 4, 2011.

ZTE: "Discussion on contention resolution of CB transmission", 3GPP Draft; R2-101101, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; 20100222, Feb. 14, 2010, XP050421455, [retrieved on Feb. 14, 2010].

\* cited by examiner

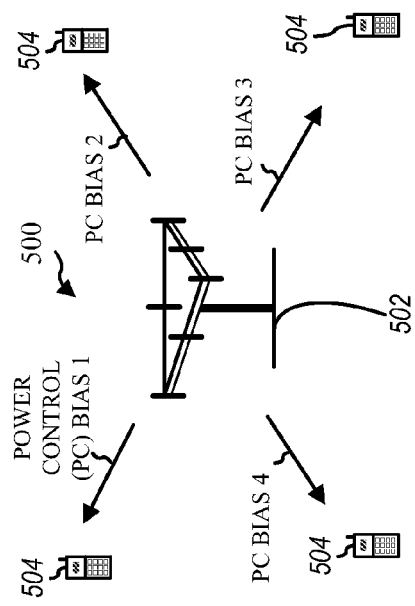
Fig. 5
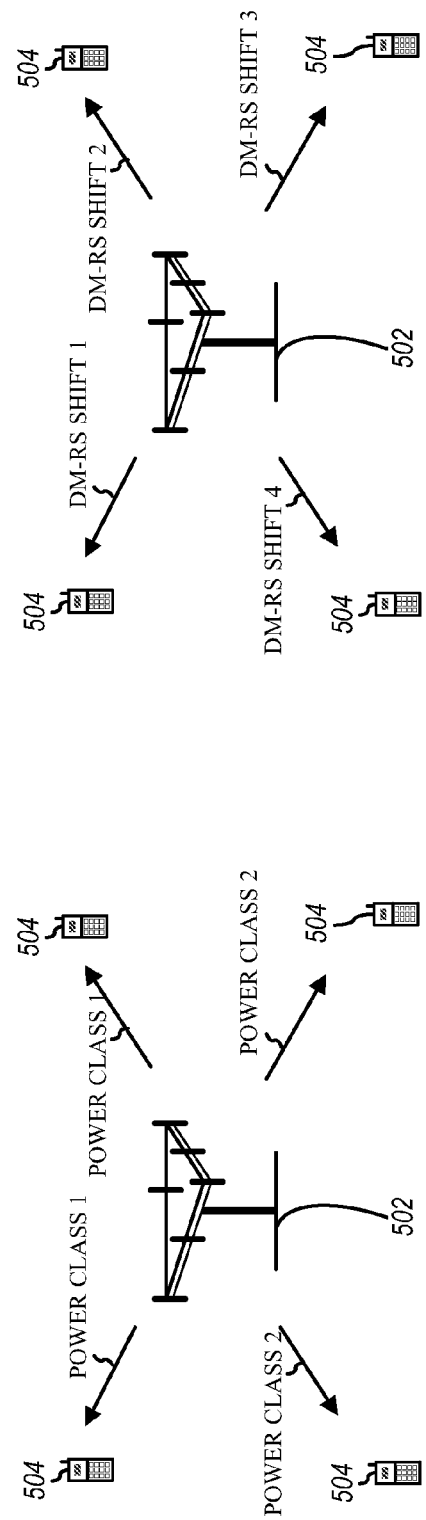
Fig. 7
Fig. 6

METHOD AND APPARATUS FOR CONTENTION-BASED WIRELESS TRANSMISSIONS

CLAIM OF PRIORITY UNDER 35 U.S.C. §119

The present application for patent claims benefit of U.S. Provisional Patent Application Ser. No. 61/326,569, entitled, "Method and Apparatus for Contention-Based Wireless Transmissions," filed Apr. 21, 2010 and assigned to the assignee hereof and hereby expressly incorporated by reference herein.

BACKGROUND

1. Field

Certain aspects of the disclosure relate generally to wireless communications systems and, more particularly, to a method for enabling contention-based wireless transmissions.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-single-out (MISO) or a multiple-in-multiple-out (MIMO) system. The base stations are generally responsible for scheduling when the uplink and downlink transmissions may occur. The use of scheduling may introduce signaling overhead and increase latency within the wireless communication system. As such, there is a need for enabling transmissions without having to provide a scheduling request for wireless resources.

SUMMARY

Certain aspects of the present disclosure provide a method for wireless communications. The method generally includes allocating a common contention-based resource for use by a plurality of user equipments (UEs) and signaling one or more transmission parameters used to differentiate uplink transmissions sent from the plurality of UEs on the contention-based resource. The method further includes receiving at least one uplink transmission sent via the contention-based resource, and determining, based on the one or more transmission parameters, which UE sent the at least one uplink transmission.

Certain aspects of the present disclosure provide an apparatus for wireless communications. The apparatus generally includes a scheduler component configured to allocate a common contention-based resource for use by a plurality of user equipments (UEs), and a transmitter component configured to signal one or more transmission parameters used to differentiate uplink transmissions sent from the plurality of UEs on the contention-based resource. The apparatus further includes a receiver component configured to receive at least one uplink transmission sent via the contention-based resource, and a UE differentiation component configured to determine, based on the one or more transmission parameters, which UE sent the at least one uplink transmission.

Certain aspects of the present disclosure provide an apparatus for wireless communications. The apparatus generally includes means for allocating a common contention-based resource for use by a plurality of user equipments (UEs) and means for signaling one or more transmission parameters used to differentiate uplink transmissions sent from the plurality of UEs on the contention-based resource. The apparatus further includes means for receiving at least one uplink transmission sent via the contention-based resource and means for determining, based on the one or more transmission parameters, which UE sent the at least one uplink transmission.

Certain aspects of the present disclosure provide a computer-program product comprising a computer-readable medium having instructions stored thereon. The instructions may be executable by one or more processors for allocating a common contention-based resource for use by a plurality of user equipments (UEs) and signaling one or more transmission parameters used to differentiate uplink transmissions sent from the plurality of UEs on the contention-based resource. The instructions may also be executable by the one or more processor for receiving at least one uplink transmission sent via the contention-based resource and determining, based on the one or more transmission parameters, which UE sent the at least one uplink transmission.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 5-7 illustrate example wireless systems in accordance with certain aspects of the present disclosure.

DETAILED DESCRIPTION

Figure 1:
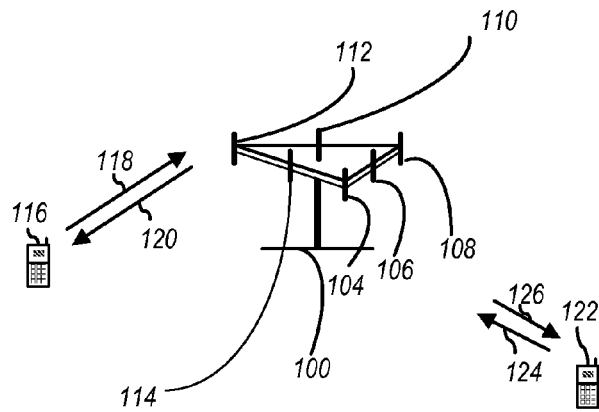
FIG. 1 illustrates a multiple access wireless communication system.

Generally, a base station allocates uplink radio resources among user equipment (UEs) based on information about the amount of data that has to be transmitted from each UE. A UE may transmit buffer status reports (BSRs) to signal the amount of data waiting in the UE's uplink transmission buffer. When a UE is not allocated enough uplink resources to transmit a BSR, the UE may first transmit a scheduling request (SR) to the base station to request resources for sending a BSR, receive an assignment, and then proceed to transmit the BSR. However, an overabundance of SRs may result in issues of delay and incur significant signaling overhead. Accordingly, mechanisms for allocating uplink resources have been proposed that enable UEs to transmit uplink data without having to prior request scheduling from the base station. These radio resources, referred to as contention-based resources, allow for uplink transmissions while reducing latency and signaling overhead, particularly during times of low system load.

Under a contention-based transmission scheme, a base station may assign contention-based Radio Network Temporary Identifiers (RNTI) to UEs to identify grants of contention-based resources. The UEs may then listen to downlink control channels (for example, a Physical Downlink Control Channel) for grants broadcasted by the base station that are addressed to these contention-based RNTI. The broadcast contention-based RNTI indicates to UEs with that given contention-based RNTI that they may immediately access the indicated uplink data resources to transmit data to the base station. Alternatively, the base station may utilize a persistent assignment of contention-based resources. Data collisions may occur when UEs transmit on the same contention-based resource, which reduces the throughput of the contention-based resource. Accordingly, there is a demand for techniques to manage a contention-based uplink channel to increase throughput while maintaining reduced signaling overhead and latency.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) includes multiple antenna groups, one including antennas 104 and 106, another including antennas 108 and 110, and yet another including antennas 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In the aspect shown in FIG. 1, each antenna group is designed to communicate to access terminals in a sector, of the areas covered by access point 100.

In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
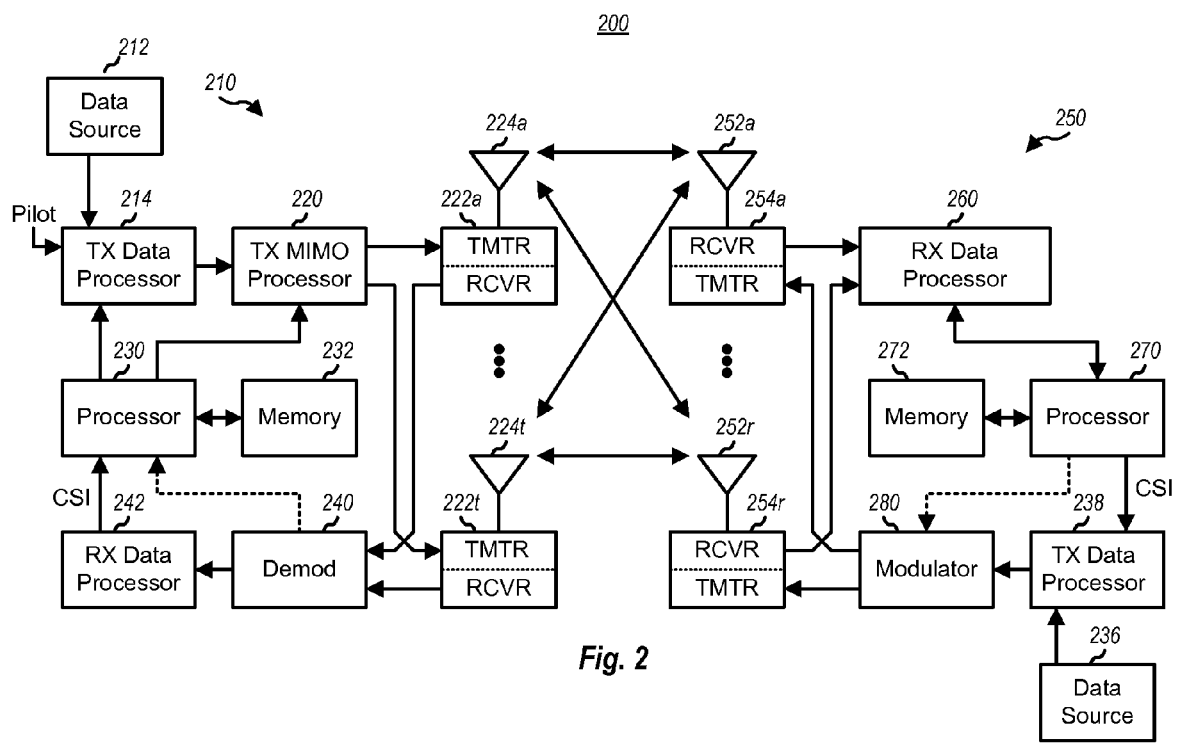
FIG. 2 is a block diagram of a communication system.

FIG. 2 is a block diagram of an aspect of a transmitter system 210 (also known as the access point) and a receiver system 250 (also known as the access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

According to certain aspects, the transmitter system 210 may be configured to signal one or more transmission parameters used to differentiate uplink transmissions from the receiver system 250 and other access terminals on a contention-based resource, as described further below.

RX data processor 260 may decode detected symbols to receive one or more transmission parameters. According to certain aspects, various components of the transmitter system 250, such as the processor 270 and TX data processor 238, may utilize the one or more transmission parameters for use in contention-based uplink transmission, as described further below. According to certain aspects, the transmission parameters may be utilized to modify the transmissions sent from the transmitter system 250 to differentiate the uplink transmissions from uplink transmissions sent by other access terminals. For example, a transmission parameter specifying a power control bias may be utilized by the transmitters 254a through 254r to transmit to a specified power. According to certain aspects, a transmission parameter indicating a demodulation reference signal shift may be utilized by the modulator 280 to modulate the data streams received by the TX data processor 238.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

According to certain aspects, the RX data processor 260 may decode detected symbols to receive one or more transmission parameters. According to certain aspects, various components of the receiver system 250, such as the processor 270 and TX data processor 238, may utilize the one or more transmission parameters for use in contention-based uplink transmission, as described further below. According to certain aspects, the transmission parameters may be utilized to modify the transmissions sent from the receiver system 250 to differentiate the uplink transmissions from uplink transmissions sent by other access terminals. For example, a transmission parameter specifying a power control bias may be utilized by the transmitters 254a through 254r to transmit to a specified power. According to certain aspects, a transmission parameter indicating a demodulation reference signal shift may be utilized by the modulator 280 to modulate the data streams received by the TX data processor 238.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

According to certain aspects, the processor 230 and RX data processor 242 may determine which access terminal sent an uplink transmission based on the transmission parameters signaled to the receiver system, as described further below.

It is generally understood that logical channels are classified into Control Channels and Traffic Channels. Logical Control Channels comprise a Broadcast Control Channel (BCCH) which is a DL channel for broadcasting system control information, a Paging Control Channel (PCCH) which is a DL channel that transfers paging information, and a Multicast Control Channel (MCCH) which is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH) which is a point-to-point bi-directional channel, dedicated to one UE, for the transfer of user information. Also, a Multicast Traffic Channel (MTCH) is a point-to-multipoint DL channel for transmitting traffic data.

It is further understood that Transport Channels are classified into DL and UL. DL Transport Channels comprise a Broadcast Channel (BCH), a Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

For the purposes of the present document, the following abbreviations apply:
ACK Acknowledgement
AM Acknowledged Mode
AMD Acknowledged Mode Data
ARQ Automatic Repeat Request
BCCH Broadcast Control CHannel
BCH Broadcast CHannel
BW Bandwidth
C- Control-
CB Contention-Based
CCE Control Channel Element
CCCH Common Control CHannel
CCH Control CHannel
CCTrCH Coded Composite Transport Channel
CDM Code Division Multiplexing
CF Contention-Free
CP Cyclic Prefix
CQI Channel Quality Indicator
CRC Cyclic Redundancy Check
CRS Common Reference Signal
CTCH Common Traffic CHannel
DCCH Dedicated Control CHannel
DCH Dedicated CHannel
DCI Downlink Control Information
DL DownLink
DRS Dedicated Reference Signal
DSCH Downlink Shared Channel
DSP Digital Signal Processor
DTCH Dedicated Traffic CHannel
E-CID Enhanced Cell IDentification
EPS Evolved Packet System
FACH Forward link Access CHannel
FDD Frequency Division Duplex
FDM Frequency Division Multiplexing
FSTD Frequency Switched Transmit Diversity
HARQ Hybrid Automatic Repeat/request
HW Hardware
IC Interference Cancellation
L1 Layer 1 (physical layer)
L2 Layer 2 (data link layer)
L3 Layer 3 (network layer)
LI Length Indicator
LLR Log-Likelihood Ratio
LSB Least Significant Bit
MAC Medium Access Control
MBMS Multimedia Broadcast Multicast Service
MCCH MBMS point-to-multipoint Control Channel
MMSE Minimum Mean Squared Error
MRW Move Receiving Window
MSB Most Significant Bit
MSCH MBMS point-to-multipoint Scheduling CHannel
MTCH MBMS point-to-multipoint Traffic CHannel
NACK Non-Acknowledgement
PA Power Amplifier
PBCH Physical Broadcast CHannel
PCCH Paging Control CHannel
PCH Paging CHannel
PCI Physical Cell Identifier
PDCCH Physical Downlink Control CHannel
PDU Protocol Data Unit
PHICH Physical HARQ Indicator CHannel
PHY PHYsical layer
PhyCH Physical CHannels
PMI Precoding Matrix Indicator
PRACH Physical Random Access Channel
PSS Primary Synchronization Signal
PUCCH Physical Uplink Control CHannel
PUSCH Physical Uplink Shared CHannel
QoS Quality of Service
RACH Random Access CHannel
RB Resource Block
RLC Radio Link Control
RRC Radio Resource Control
RE Resource Element
RI Rank Indicator
RNTI Radio Network Temporary Identifier
RS Reference Signal
RTT Round Trip Time
Rx Receive
SAP Service Access Point
SDU Service Data Unit
SFBC Space Frequency Block Code
SHCCH SHared channel Control CHannel
SNR Signal-to-Interference-and-Noise Ratio
SN Sequence Number
SR Scheduling Request
SRS Sounding Reference Signal
SSS Secondary Synchronization Signal
SU-MIMO Single User Multiple Input Multiple Output
SUFI SUper Field
SW Software
TA Timing Advance
TCH Traffic CHannel
TDD Time Division Duplex
TDM Time Division Multiplexing
TFI Transport Format Indicator
TPC Transmit Power Control
TTI Transmission Time Interval
Tx Transmit
U- User-
UE User Equipment
UL UpLink
UM Unacknowledged Mode UMD Unacknowledged Mode Data
UMTS Universal Mobile Telecommunications System
UTRA UMTS Terrestrial Radio Access
UTRAN UMTS Terrestrial Radio Access Network
VOIP Voice Over Internet Protocol
MBSFN multicast broadcast single frequency network
MCH multicast channel
DL-SCH downlink shared channel
PDCCH physical downlink control channel
PDSCH physical downlink shared channel Contention-Based Uplink Shared Communications According to certain aspects, a contention-based transmission scheme is provided that enables high throughput in uplink transmission with potential use of advanced receivers. According to certain aspects, a base station may assign contention-based resources to a plurality of UEs. The contention-based resources may be part of a physical uplink data channel, such as a Physical Uplink Shared Channel (PUSCH). The assignment of contention-based may be persistent, semi-static, or dynamic. According to certain aspects, the base station may provide transmission parameters during configuration and/or assignment of the contention-based resources. The base station may utilize the transmission parameters to differentiate uplink transmissions sent from the plurality of UEs on the contention-based resources and determine which UE sent which uplink transmission.

Figure 3:
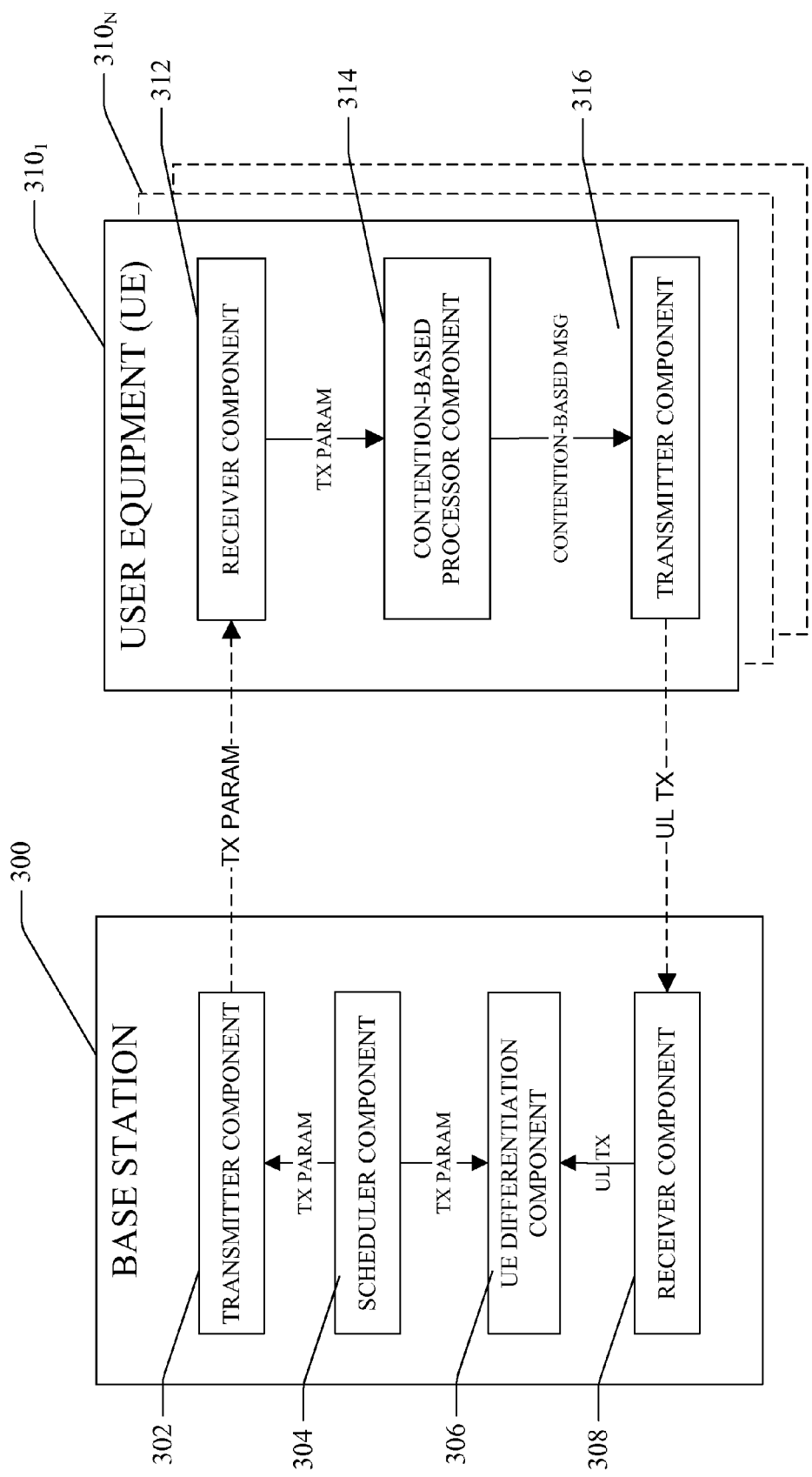
FIG. 3 illustrates example components capable of implementing techniques presented herein.

FIG. 3 illustrates an example wireless system capable of performing techniques described herein for distinguishing transmissions from UEs that share a common contention-based resource. As illustrated, the wireless system may include a base station 300 in communication with a plurality of UEs $310_1$ to $310_N$. For clarity, certain aspects of the disclosure may be discussed in relation to the UE $310_1$, but, it is understood certain aspects may apply similarly to other UEs of the plurality of UEs $310_1$ to $310_N$.

According to certain aspects, the base station 300 may include a scheduler component 304 that allocates a common contention-based resource for use by the UE $310_1$. As illustrated, the scheduler component 304 may provide one or more transmission parameters (shown as "TX PARAM") to a transmitter component 302 to signal to the plurality of UEs $310_1$ to $310_N$. The one or more transmission parameters may be used by the base station 300 to later distinguish uplink transmissions sent from the plurality of UEs on the contention-based resource. According to certain aspects, the transmission parameter may vary a transmit power used by the UEs for uplink transmission on the contention-based resource. According to certain aspects, the transmission parameter may be a particular demodulation reference signal (DM-RS) shift assigned to a UE for use in uplink transmissions on the contention-based resource.

As illustrated, the UE $310_1$ includes a receiver component 312 that receives one or more transmission parameters from the base station 300. The transmission parameters may be used by the UE to control how the UE $310_1$ transmits on the contention-based resource, for example, with a given transmit power, or with a particular DM-RS signal. As illustrated, the receiver component 312 provides the one or more transmission parameters to a contention-based processor component 314, which generates a contention-based message for uplink transmission on the contention-based resource. As illustrated, the contention-based processor component 314 provides the transmission parameters and the contention-based message to the transmitter component 316 for uplink transmission to the base station 300 utilizing contention-based resources.

According to certain aspects, the transmitter component 316 may utilize a transmission parameter indicating a power control bias to transmit the contention-based message on the contention-based resource at a high power. According to certain aspects, the transmitter component 316 may utilize a transmission parameter indicating a DM-RS shift to transmit the contention-based message with a particular DM-RS sequence on the contention-based resource.

As illustrated, a receiver component 308 of the base station 300 receives the uplink transmission on the contention-based resources and provides the uplink transmissions to a UE differentiation component 306. The UE differentiation component 306 determines which UE sent the uplink transmission based on the one or more transmission parameter that may be provided to the UE differentiation component 306 by the scheduler component 304, as illustrated. According to certain aspects, the base station 300 may compare a transmit power of a received uplink transmission to a transmission parameter assigning a power control bias to a particular UE to determine that the uplink transmission was sent by the particular UE. According to certain aspects, the base station 300 may attempt to decode a received uplink transmission with a DM-RS sequence assigned by a transmission parameter to a particular UE to determine that the uplink transmissions was sent from the particular UE.

Figure 4:
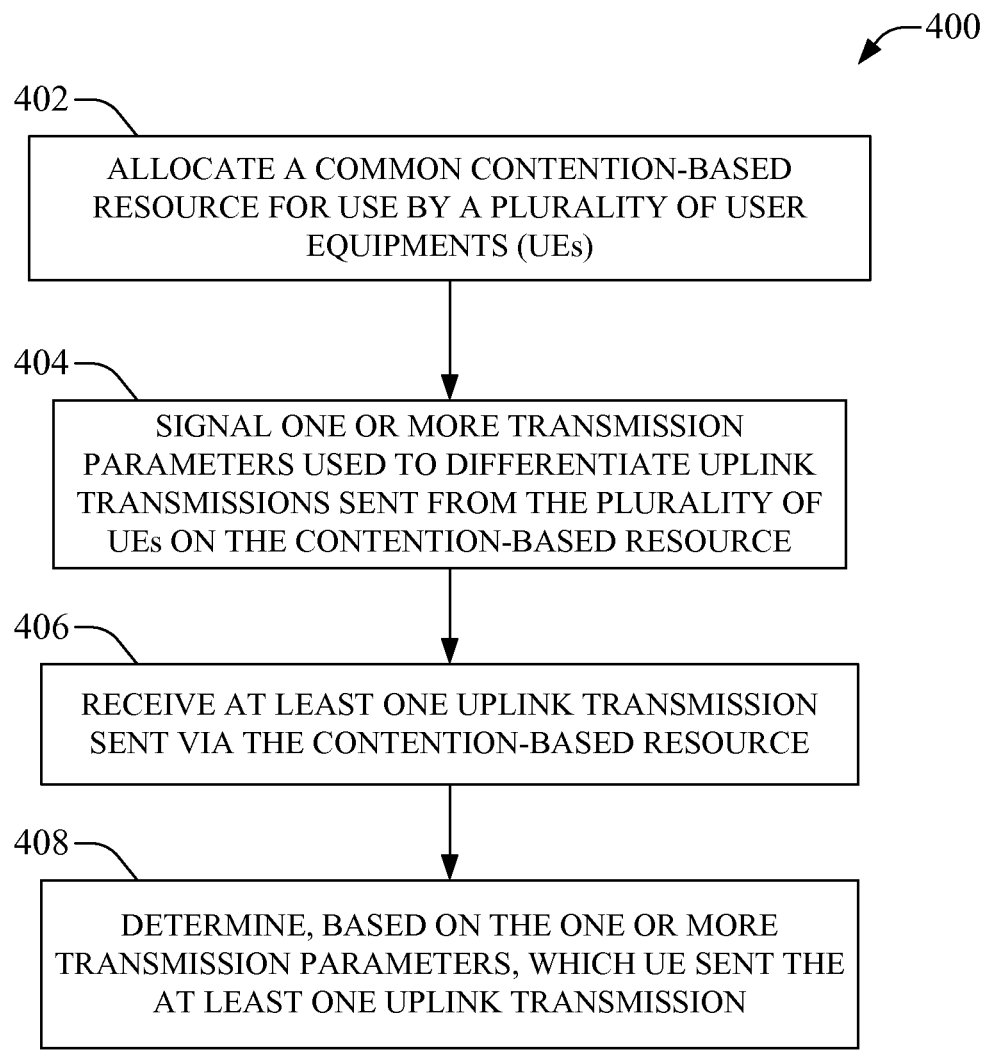
FIG. 4 illustrates an example operation that may be performed by an access point in accordance with certain aspects of the present disclosure.

FIG. 4 illustrates an example operation 400 that may be performed by a base station for managing contention-base resources in accordance with aspects of the present disclosure. The operation 400 may begin at 402 where a base station may allocate a common contention-based resource for use by a plurality of UEs. According to certain aspects, the contention-based resource may be a radio resource of a physical uplink data channel such as PUSCH. According to certain aspects, the base station may assign the contention-based resource to the plurality of UEs in a physical downlink control channel (PDCCH).

At 404, the base station may signal one or more transmission parameters used to differentiate uplink transmissions sent from the plurality of UEs on the contention-based resource. The transmission parameters may be given to the plurality of UEs when the contention-based resources are configured. According to certain aspects, the transmission parameters may be signaled with Layer 3 signaling, for example, during a call set-up or during a radio resource control (RRC) configuration. According to certain aspects, the base station may signal the transmission parameters to the plurality of UEs in a PDCCH, with the assignment of the contention-based resource.

At 406, the base station receives at least one uplink transmission sent via the contention-based resource. According to certain aspects, a plurality of uplink transmission may be received from a plurality of UEs via the contention-based resource. To properly process the uplink transmission, the base station may determine the sender of each of the uplink transmissions.

At 408, the base station may determine, based on the one or more transmission parameters, which UE sent the at least one uplink transmission. For example, according to certain aspects, the base station may determine which UE sent the uplink transmission based on a corresponding received power. According to certain aspects, the base station may determine which UE sent the uplink transmission based on a signal DM-RS shift used to successfully demodulate the uplink transmissions.

FIGS. 5-7 illustrate an example wireless system 500 in which certain aspects of the present disclosure may be practiced. As illustrated, the system 500 includes a base station 502 that communicates with a plurality of UEs 504. The base station 502 may signal one or more transmission parameters to the plurality of UEs 504 to be used to distinguish uplink transmission sent from the plurality of UEs 504 on a contention-based resource.

As illustrated in FIG. 5, according to certain aspects, the base station 502 may signal a transmission parameter that includes at least one power control bias indicative to at least one of the plurality of UEs 504 that the UE should transmit at a high power relative to the other UEs. While base station 502 is illustrated as transmitting a power control bias to all of the plurality of UEs 504, it is understood that the base station 502 may transmit a power control bias to just one of the plurality of UEs 504 or fewer than all of UEs. It is further noted that the base station 502 may transmit a specific power control bias to each of the plurality of UEs 504, a common power control bias to a subset of the plurality of UEs, or some combination thereof. Uplink transmissions by a UE at a higher power on a contention-based resource may more likely be successfully received by the base station 502 than uplink transmissions by other UEs at a lower power, thereby allowing at least one UE to be successfully received despite more than one UE attempting to utilize the contention-base resource. In contrast, in a conventional configuration, a plurality of UEs may be instructed to transmit on the contention-based resource at a same power which may result in none of the UEs having transmissions successfully received. As such, techniques according to certain aspects described herein may advantageously produce a higher throughput on contention-based resources when compared to conventional configurations.

The base station 502 may determine a power control bias for a given UE based on a variety of factors. According to certain aspects, the base station 502 may determine a power control bias based on a quality of service (QoS) for a UE. According to certain aspects, the base station 502 may determine power control biases for a UE based on a fairness heuristic to ensure no single UE may monopolize a high power bandwidth. For example, the base station 502 may evenly distribute an assignment of a high power control bias to each of the plurality of UEs 504 over time.

As illustrated in FIG. 6, according to certain aspects, the base station 502 may signal to the plurality of UEs an assignment to a power class selected to target a target a pre-determined signal-to-noise-plus-interference-ratio (SNIR) at the base station 502. According to certain aspects, the base station 502 may divide the plurality of UEs 504 into power classes for contention-based access. For example, the base station 502 may assign a first subset of the plurality of UEs 504 to a high power class and assign a second subset of the plurality of UEs 504 to a low power class. According to certain aspects, UEs of the high power class may target a higher signal-to-noise-plus-interference-ratio (SNIR) at the receiver of the base station. UEs of the low power class may target a lower SNIR at the receiver of the base station. According to certain aspects, the assignment of power class may implicitly change over time.

As illustrated in FIG. 7, according to certain aspects, the base station 502 may signal a cyclic shift for a DM-RS assigned to at least one of the plurality of UEs. A DM-RS generally provides an estimate of the uplink channel experienced by the uplink data transmission to enable the base station 502 to coherently demodulate the uplink transmissions. According to certain aspects, a DM-RS shift may comprise a signature sequence for a reference signal (RS) that is assigned to each UE by the base station 502. The base station may assign a DM-RS shift to a UE when the contention-based resource is configured. Additionally, the DM-RS shift as described herein may be in addition to a second DM-RS shift that may be broadcast to the plurality of UEs in a contention-based uplink grant. According to certain aspects, the DM-RS shift may implicitly change over time. For example, the base station 502 may assign a different DM-RS shift to a UE according to a random distribution.

According to certain aspects, when the plurality of UEs 504 transmit on the contention-based resource, the base station 502 may detect a plurality of RS patterns, decode a first uplink transmission using one of the RS patterns, cancel the signal, and decode a second uplink transmission using another one of the RS patterns. Accordingly, certain aspects of the present disclosure provide for higher throughput by enabling a higher probability that even though a plurality of UEs may use the contention-based resource at the same time, the use of a different signature sequence for the RS may enable the base station 502 to detect and decode the different uplink transmissions.

Certain aspects of the present disclosure provide for feedback and acknowledgement (i.e., HARQ) using the contention-based resource. According to certain aspects, the base station may assign multiple DM-RS patterns to a plurality of UEs and may attempt, in a blind manner to combine hypothetical previous transmissions received from the UEs. For example, a base station may attempt to decode a first uplink transmission from a UE using a first DM-RS pattern, but may be unsuccessful at decoding. The base station may then attempt to decode the transmission using a second DM-RS pattern which is known by the base station to be assigned to a prior uplink transmission. Accordingly, certain aspects of the present disclosure advantageously provide multiple chances to decode an uplink transmission transmitted via the contention-based resource.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for signaling or means for transmitting may comprise a transmitter, such as the transmitter unit 222 of the transmitter system 210 (e.g., the access point) shown in FIG. 2. Means for receiving may comprise a receiver, such as the receiver unit 222 of the transmitter system 210 shown in FIG. 2. Means for allocating, means for determining, and/or means for assigning may comprise a processing system, which may include one or more processors, such as the processor 270 of the receiver system 250 or the processor 230 of the transmitter system 210 illustrated in FIG. 2. These means may also comprise any suitable combination of the transmitter component 302, the scheduler component 304, the UE differentiation component 306, and the receiver component 308 of FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
   allocating a common contention-based resource for use by a plurality of user equipments (UEs);
   signaling transmission parameters used to differentiate uplink transmissions sent from the plurality of UEs on the common contention-based resource, the transmission parameters include at least one demodulation reference signal (DM-RS) shift,
      the transmission parameters including at least a first transmission parameters and a second transmission parameter,
         the first transmission parameter and the second transmission parameter being signaled for different ones of the plurality of UEs;
   receiving at least one uplink transmission sent via the common contention-based resource; and
   determining, based at least in part on the transmission parameters, which one of the plurality of UEs sent the at least one uplink transmission.

2. The method of claim 1, wherein the transmission parameters comprise:
   at least one power control bias indicating at least one of the plurality of UEs should transmit at a high power relative to other UEs of the plurality of UEs.

3. The method of claim 1, further comprising:
   assigning a first subset of the plurality of UEs to a first power class; and
   assigning a second subset of the plurality of UEs to a second power class.

4. The method of claim 3, wherein the assignment of the first subset of the plurality of UEs to the first power class and the assignment of the second subset of the plurality of UEs to the second power class changes from a first time to second time.

5. The method of claim 3, wherein the assignment of the first power class or the second power class is based on Quality of Service (QoS).

6. The method of claim 1, wherein the DM-RS shift comprises a signature sequence for a DM-RS signal.

7. The method of claim 1, wherein the signaling comprises signaling the transmission parameters during a radio resource control (RRC) configuration.

8. The method of claim 1, wherein the signaling comprises:
   transmitting the transmission parameters with an assignment of the common contention-based resource in a physical downlink control channel (PDCCH).

9. The method of claim 8, wherein the assignment comprises a persistent assignment of the contention-based resource.

10. An apparatus for wireless communications, comprising:
    a scheduler component configured to allocate a common contention-based resource for use by a plurality of user equipments (UEs);
    a transmitter component configured to signal transmission parameters used to differentiate uplink transmissions sent from the plurality of UEs on the common contention-based resource, the transmission parameters include at least one demodulation reference signal (DM-RS) shift,
       the transmission parameters including at least a first transmission parameter and a second transmission parameter,
          the first transmission parameter and the second transmission parameter being signaled for different ones of the plurality of UEs;
    a receiver component configured to receive at least one uplink transmission sent via the common contention-based resource; and
    a UE differentiation component configured to determine, based at least in part on the transmission parameters, which one of the plurality of UEs sent the at least one uplink transmission.

11. The apparatus of claim 10, wherein the transmission parameters comprise:
    at least one power control bias indicating at least one of the plurality of UEs should transmit at a high power relative to other UEs of the plurality of UEs.

12. The apparatus of claim 10, wherein the scheduler component is further configured to:
    assign a first subset of the plurality of UEs to a first power class; and assign a second subset of the plurality of UEs to a second power class.

13. The apparatus of claim 12, wherein the assignment of the first subset of the plurality of UEs to the first power class and the assignment of the second subset of the plurality of UEs to the second power class changes from a first time to second time.

14. The apparatus of claim 12, wherein the assignment of the first power class or the second power class is based on Quality of Service (QoS).

15. The apparatus of claim 10, wherein the DM-RS shift comprises a signature sequence for a DM-RS signal.

16. The apparatus of claim 10, wherein the transmitter component is further configured to signal the transmission parameters during a radio resource control (RRC) configuration.

17. The apparatus of claim 10, wherein the transmitter component is further configured to transmit the transmission parameters with an assignment of the common contention-based resource in a physical downlink control channel (PDCCH).

18. The apparatus of claim 17, wherein the assignment comprises a persistent assignment of the common contention-based resource.

19. An apparatus for wireless communications, comprising:
    means for allocating a common contention-based resource for use by a plurality of user equipments (UEs);
    means for signaling transmission parameters used to differentiate uplink transmissions sent from the plurality of UEs on the common contention-based resource, the transmission parameters include at least one demodulation reference signal (DM-RS) shift,
        the transmission parameters including at least a first transmission parameter and a second transmission parameter,
            the first transmission parameter being signaled for a first UE, of the plurality of UEs, and the second transmission parameter being signaled for a second UE of the plurality of UEs;
    means for receiving at least one uplink transmission sent via the common contention-based resource; and
    means for determining, based at least in part on the transmission parameters, which one of the plurality of UEs sent the at least one uplink transmission.

20. The apparatus of claim 19, wherein the transmission parameters comprise:
    at least one power control bias indicating at least one of the plurality of UEs should transmit at a high power relative to other UEs of the plurality of UEs.

21. The apparatus of claim 19, further comprising:
    means for assigning a first subset of the plurality of UEs to a first power class; and
    means for assigning a second subset of the plurality of UEs to a second power class.

22. The apparatus of claim 21, wherein the assignment of the first subset of the plurality of UEs to the first power class and the assignment of the second subset of the plurality of UEs to the second power class changes from a first time to second time.

23. The apparatus of claim 21, wherein the assignment of the first power class or the second power class is based on Quality of Service (QoS).

24. The apparatus of claim 19, wherein the DM-RS shift comprises a signature sequence for a DM-RS signal.

25. The apparatus of claim 19, wherein the means for signaling comprises means for signaling the transmission parameters during a radio resource control (RRC) configuration.

26. The apparatus of claim 19, wherein the means for signaling comprises:
    means for transmitting the transmission parameters with an assignment of the common contention-based resource in a physical downlink control channel (PDCCH).

27. The apparatus of claim 26, wherein the assignment comprises a persistent assignment of the common contention-based resource.

28. A non-transitory computer-program medium storing instructions, the instructions comprising:
    one or more instructions which, when executed by a processor, cause the processor to:
        allocating a common contention-based resource for use by a plurality of user equipments (UEs);
        signaling transmission parameters used to differentiate uplink transmissions sent from the plurality of UEs on the common contention-based resource, the transmission parameters comprise at least one demodulation reference signal (DM-RS) shift,
            the transmission parameters including at least a first transmission parameter and a second transmission parameters,
                the first transmission parameters and the second transmission parameter being signaled for different ones of the plurality of UEs;
        receiving at least one uplink transmission sent via the common contention-based resource; and
        determining, based at least in part on the transmission parameters, which one of the plurality of UEs sent the at least one uplink transmission.

29. The non-transitory computer-readable medium of claim 28, wherein the transmission parameters comprise:
    at least one power control bias indicating at least one of the plurality of UEs should transmit at a high power relative to other UEs of the plurality of UEs.

30. The non-transitory computer-readable medium of claim 28, wherein the instructions further comprise:
    one or more instructions to assign a first subset of the plurality of UEs to a first power class; and
    one or more instructions to assign a second subset of the plurality of UEs to a second power class.

31. The non-transitory computer-readable medium of claim 30, wherein the assignment of the first subset of the plurality of UEs to the first power class and the assignment of the second subset of the plurality of UEs to the second power class changes from a first time to second time.

32. The non-transitory computer-program medium of claim 30, wherein the assignment of the first power class or the second power class is based on Quality of Service (QoS).

33. The non-transitory computer-readable medium of claim 28, wherein the DM-RS shift comprises a signature sequence for a DM-RS signal.

34. The non-transitory computer-readable medium of claim 28, wherein the one or more instructions to signal comprise:
    one or more instructions to signal the transmission parameters during a radio resource control (RRC) configuration.

35. The non-transitory computer-readable medium of claim 28, wherein the one or more instructions to signal comprise:

one or more instructions to signal the transmission parameters with an assignment of the common contention-based resource in a physical downlink control channel (PDCCH).

36. non-transitory computer-readable medium of claim 35, wherein the assignment comprises a persistent assignment of the common contention-based resource.

* * * * *